Feb. 8, 1927.
W. C. GOSS
1,616,793
DISAPPEARING STEP FOR VEHICLES
Filed Nov. 12, 1925
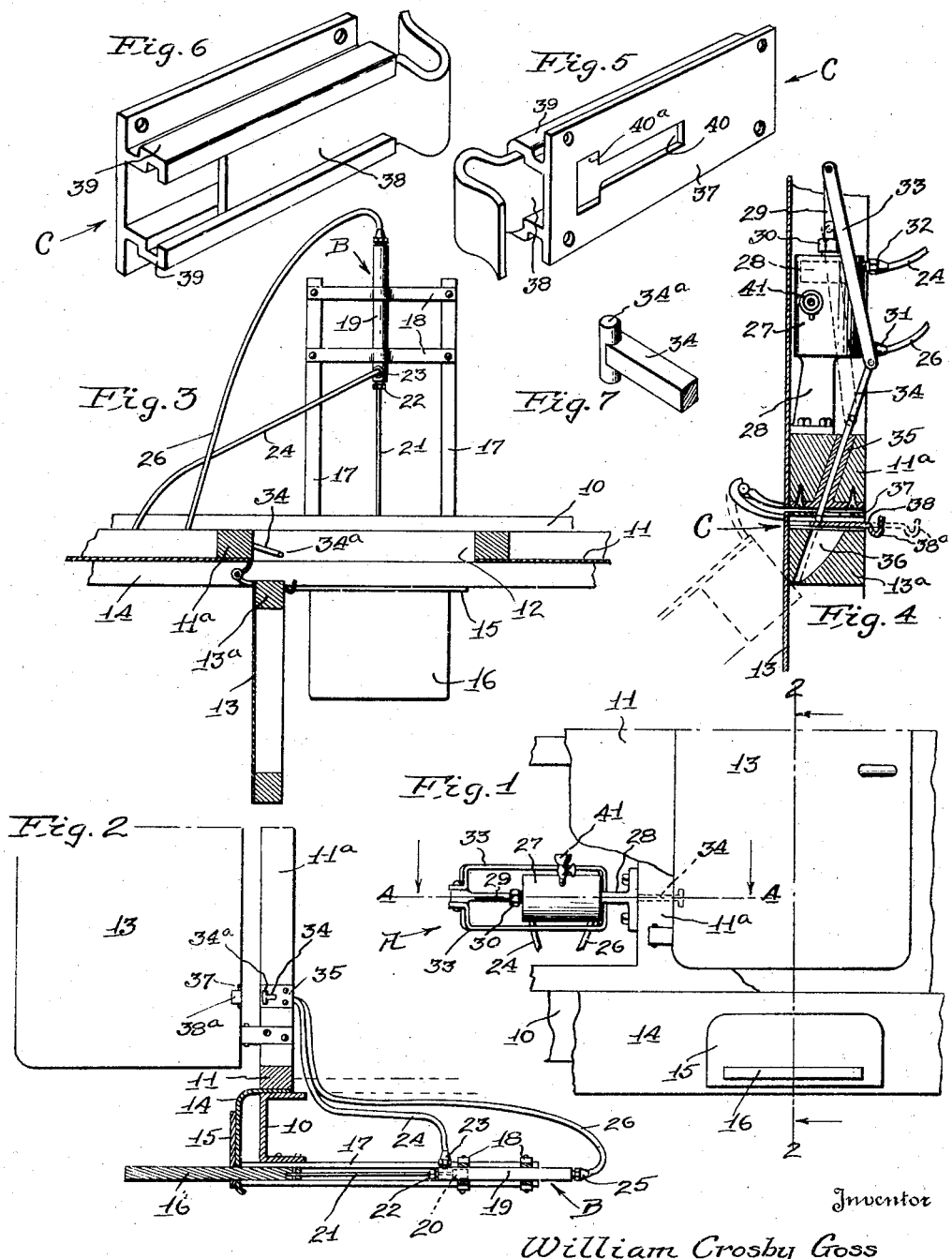
Inventor
William Crosby Goss
By Bradbury + Caswell
Attorneys Patented Feb. 8, 1927.

1,616,793

UNITED STATES PATENT OFFICE.

WILLIAM CROSBY GOSS, OF MINNEAPOLIS, MINNESOTA.

DISAPPEARING STEP FOR VEHICLES.

Application filed November 12, 1925. Serial No. 68,577.

My invention relates to improvements in disappearing steps particularly, though not exclusively for automobiles.

From the standpoint of safety to those who would board an automobile without knowledge thereof on the part of the driver and from the standpoint of comfort and safety to the occupants of an automobile as against the boarding thereof by uninvited or dangerous persons, it is desirable that steps be provided which will shift into inaccessible positions of disuse upon the closing of the doors and also shift into positions of use upon the opening of the doors.

An object of my invention is to provide a simple, durable and inexpensive structure adapted readily to be incorporated in any conventional type of automobile, the same including a step for a doorway of the automobile movable back and forth between position for use and sheathed position of disuse and, also, including novel mechanism actuated upon the opening and closing of the door for said doorway to retract and to extend said step.

Another object of the invention is to supply a step operating mechanism, parts thereof being adapted readily to be arranged to suit varying conditions and to avoid interference with other parts of an automobile.

A further object is to provide such step operating mechanism, wherein an easily movable and accessible part is employed to render said mechanism ineffective in shifting the step upon the opening and closing of the door.

An additional object is to supply such mechanism, which, when ineffective, as above noted, operates to hold the step projected.

With the foregoing and other objects in view, which will appear in the following description, the invention resides in the novel combination and arrangement of parts and in the details of construction hereinafter described and claimed.

In the drawings, Fig. 1 is a fragmentary elevational view of an automobile and of parts of my improvement applied thereto; Fig. 2 is a vertical sectional view taken as on the line 2—2 of Fig. 1, the door being shown open and the step projected in contradistinction to the closed position of the door and the retracted position of the step in said Fig. 1; Fig. 3 is a plan view of the structure shown in Fig. 2; Fig. 4 is an enlarged sectional view, in detail, the same being taken as on the line 4—4 of Fig. 1; Figs. 5 and 6 are perspective views in detail of part of the step shifting means, which provides for arresting the co-action of said means with the door upon the opening and closing of the latter; and Fig. 7 is a detail perspective view of the tip of the push-pull rod, which co-acts with the members shown in Figs. 5 and 6.

Referring to the drawings, it will be seen that my improvement is readily applicable to the illustrated conventional type of automobile including a frame 10, body 11 with doorway 12 therein, door 13 for said doorway, toe-board 14 and kick-plate 15. Said improvement includes a horizontal step 16, the same being slidably mounted at its side edges in channel guides 17 riveted to the frame 10. These guides 17 are disposed transversely of the frame 10 and the step 16, movable in said guides inwardly and outwardly of the vehicle, may be projected through complementing openings in the toe-board 14 and kick-plate 15 into position of use (Figs. 2 and 3) or retracted into position of disuse within the confines of the vehicle frame.

This sliding step 16 is associated with operating means therefor, said means coacting with the door 13 so that upon the opening thereof the step 16 will be projected and upon the closing thereof said step will be retracted. Mounted on the guides 17, between tie-bars 18 secured thereto, is a cylinder 19, closed at its ends, and fitted with a piston 20. A piston rod 21 for said piston reaches through a packing gland 22 at the outer end of said cylinder 19, said piston-rod being secured at its outer end to the inner end of the step 16. Communicating with the interior of the cylinder 19 at the outer end thereof is a fitting 23 by which a lead 24 of soft tubing is connected with said end of said cylinder. Also, communicating with the interior of the cylinder 19 at the inner end thereof is a fitting 25 by which a lead 26 of tubing is connected with said inner end of said cylinder. The leads or tubes 24, 26 are lead, through any available space from the cylinder 19, into the body of the vehicle. In the body 11, I arrange a power cylinder and piston assembly A to actuate the operating cylinder and piston assembly B consisting of the aforesaid cylinder 19 and piston 20. Said power assembly A includes a cylinder 27, closed at its ends and formed with a bracket 28ᵃ at the front thereof which is fastened as by means of screws to the door post 11ᵃ of the body 11. Within the cylinder 27 is a piston 28, the same having a piston rod 29 extending through a packing gland 30 at the rear end of said cylinder. At the forward extremity of the cylinder 27 is a fitting 31 communicating with the interior thereof and to which fitting the lead or tube 26 is connected. At the rear extremity of said cylinder 27 is a fitting 32 communicating with the interior thereof and to which fitting the lead 24 is connected.

Two opposed links 33, comprising a yoke, are each connected at its rear end with the rear end of the piston rod 29 and at the forward end to the rear end of a push-pull rod 34. Said push-pull rod 34 is slidable in a bearing sleeve 35 socketed in the door post 11ᵃ, the forward end of said rod reaching beyond the front face of said post and provided at that end with a head 34ᵃ. The door stile 13ᵃ at the hinged edge of the door 13 is recessed as at 36 (Fig. 4) to permit the closing of the door without interference with the forward end of the push-pull rod 34. Also recessed in and secured to said stile 13ᵃ is a fitting C (Figs. 5 and 6) comprising a fixed rear plate 37 and a front plate 38 slidably mounted in guides 39 on said first plate. The rear plate 37 has a key-slot 40 therein, the head 40ᵃ of said slot being adapted to permit of the clearance of said plate 37 with the head 34ᵃ of the push-pull rod 34 in given relative positions of said parts, said plate being adapted, at times, to provide a pulling abutment for the head 34ᵃ of the rod 34. The front plate 38 provides a pushing abutment for said head 34ᵃ of said rod 34 in one position of said plate in the fitting C, while in another position in said fitting, said plate 38 offers no obstruction to said rod 34.

In use, the cylinders 27 and 19 together with the leads 24 and 26 are filled with a light grade of oil or other suitable operating fluid, the supply being replenished from time to time in case of leakage by adding fluid thereto through the valved filler-cup 41 on the cylinder 27. When the door 13 stands closed, the step 16 is retracted. Now, upon an opening swing of the door 13, the rear plate 37 of the fitting C, slidably co-operating with the head 34ᵃ of the rod 34, causes said rod to be pulled forwardly until it is cleared at the head 40ᵃ of the key-slot 40. During said forward thrust of the rod 34, the piston 28 is driven forward in the cylinder 27 with the resultant outward thrust of the piston 20 in the cylinder 19 and a corresponding projection of the step 16 (Figs. 2 and 3). This action of the piston 20 is caused by the fluid forced through the lead 26 and, in this connection, it will be noted that the oil back of said piston is forced through the lead 24 back of the piston 28 in the cylinder 27. The slidable front plate 38, in normal position (Figs. 5, 6 and solid lines, Fig. 4), strikes the head 34ᵃ of the rod 34 upon the closing of the door, the result being that the rod 34 is pushed rearwardly moving with it the yoke links 33 and piston 28. If, however, the front plate 38 is pulled from the fitting C as by means of the finger piece 38ᵃ (dotted lines Fig. 4), said plate offers no obstruction to the head 34ᵃ of the rod 34, said rod being then free to remain in forwardly extended position. When the power piston 28 is pushed rearward under the action of the rod 34, oil is forced through the lead 24 into the inner end of the operating cylinder 19 and thus directed works against the piston 20 retracting the step 16, the oil on the opposite side of said piston 20 being forced back into the cylinder 27 through the lead 26. The front plate 38 of the fitting C is usually left operatively disposed in its normal sheathed position, the same being pulled out of such position only when it is desired that the step 16 remain projected in position of use upon the closing of the door 13. With said plate 38 thus adjusted to throw the step shifting mechanism out of co-action with the door 13, said mechanism serves to hold the step 16 projected, during the swinging of the door 13, until the plate 38 is pushed back into its said normal position.

In vehicles having a plurality of doors on a side, I contemplate, in some instances, widening the step structure so that a number thereof projected in the same plane will, in effect, provide a running board.

While I have illustrated and described the step 16 as being slidable at its side edges in the channels of the guides 17, it will be understood that roller bearings may be provided between step and guides.

Changes in the specific form of my invention, as herein disclosed, may be made within the scope of what is claimed without departing from the spirit of my invention.

Having described my invention, what I claim as new and desire to protect by Letters Patent is:

1. The combination with a vehicle including a frame, a body with a doorway therein and a door for the doorway, of a step movably mounted on the frame and shiftable into projected position of use and into retracted position of disuse, means actuated by the door upon the opening and closing thereof for shifting said step, said means including a part movably mounted on the body and a co-operating part carried by the door, said latter part comprising two members, one a fixed member operating upon said movable part during a swing of the door in one direction and the second an adjustable member operating, in the normal position thereof, upon said movable part during a reverse swing of said door, said adjustable member being movable out of its said normal operative position.

2. The combination with a vehicle including a frame, a body with a doorway therein and a door therefor, of a step movably mounted on said frame and shiftable into projected position of use and into retracted position of disuse, a power cylinder and piston assembly, the piston being actuated by said door upon the opening and closing thereof, an operating cylinder and piston assembly, the piston thereof being connected with said step, a lead bringing one end of one cylinder into communication with one end of the other cylinder and a second lead bringing the other end of said first cylinder into communication with the other end of said second cylinder, whereby upon the opening of the door the step is projected and upon closing of the door said step is retracted.

3. The combination with a vehicle including a frame, a body having a doorway therein and a door therefor, of a step for said doorway movably mounted on said frame and shiftable into and out of position of use, and means normally co-acting with the door upon the opening and closing thereof for shifting said step, said means including a device adjustable to discontinue the co-action between said means and said door, whereby the step is allowed to remain in given position upon the swinging of said door.

4. The combination with a vehicle including a frame, a body having a doorway therein and a door therefor, of a step for said doorway movably mounted on said frame and shiftable into and out of position of use, means adapted to be thrown into and out of co-operation with the door and, in the former relation, to shift said step upon the opening and closing of said door and, in the latter relation, to hold said step in given position.

5. The combination with a vehicle body having a doorway and a door therefor, of a movably mountetd step for said doorway, means for moving said step including a movable member, said member co-operating with said door and actuated thereby during a part only of the movement of the door.

6. The combination with a vehicle body having a doorway and a door therefor, of a movably mounted step for said doorway, means for moving said step including a movable member, and a catch on said door for co-operation with said member for moving the same, said member and catch being adapted to become engaged and disengaged during certain stages in the movement of said door.

7. The combination with a vehicle body having a doorway and a door therefor, of a movably mounted step for said doorway, means for moving said step including a movable member having a head thereon, a plate attached to said door having a shoulder for engagement with said head, said plate being arranged to cause said head to move with and along said shoulder upon movement of said door, said shoulder terminating at a point to cause said head to be disengaged therefrom upon a partial opening movement of said door.

In testimony whereof, I have signed my name to this specification.

WILLIAM CROSBY GOSS.